(12) United States Patent
Riu

(10) Patent No.: US 7,300,372 B2
(45) Date of Patent: Nov. 27, 2007

(54) INTEGRATED PULLEY-TORSIONAL DAMPER ASSEMBLY

(75) Inventor: Hervé Riu, La Murette (FR)

(73) Assignee: Dayco Europe S.r.l. con Unico Socio, Chieti (IT)

(*) Notice: Subject to any disclaimer, the term of this patent is extended or adjusted under 35 U.S.C. 154(b) by 0 days.

(21) Appl. No.: 10/522,210

(22) PCT Filed: Jul. 10, 2003

(86) PCT No.: PCT/IT03/00432

§ 371 (c)(1),
(2), (4) Date: Feb. 24, 2005

(87) PCT Pub. No.: WO2004/007992

PCT Pub. Date: Jan. 22, 2004

(65) Prior Publication Data

US 2006/0094547 A1    May 4, 2006

(30) Foreign Application Priority Data

Jul. 16, 2002  (IT) .......................... TO2002A0622

(51) Int. Cl.
*F16D 3/00* (2006.01)
*F16H 55/14* (2006.01)
*F16H 55/36* (2006.01)

(52) U.S. Cl. .......................... 474/94; 464/90
(58) Field of Classification Search ................ 74/94, 74/574.2; 474/94; 464/89, 90, 92
See application file for complete search history.

(56) References Cited

U.S. PATENT DOCUMENTS 2,449,003 A    9/1948  Upham et al.
4,804,075 A  *  2/1989  Koitabashi ............. 192/84.941
4,860,867 A  *  8/1989  Nishimura ............. 192/84.941

(Continued)

FOREIGN PATENT DOCUMENTS

| CN | 1140992 A | 1/1997 |
| EP | 0364875 A | 4/1980 |
| JP | 43025506 B | 11/1968 |
| JP | 1104075 A | 4/1989 |
| JP | 1132586 A | 5/1989 |
| WO | WO 96/25611 | 2/1996 |

OTHER PUBLICATIONS

Kunio Y: "studies on fatty esters of flavins I, chemical synthesis of fatty acid esters of riboflavin." The Journal of Vitaminology, 1961, (7):276-280.

(Continued)

*Primary Examiner*—Marcus Charles
*Assistant Examiner*—James Pilkington
(74) *Attorney, Agent, or Firm*—Blakely, Sokoloff, Taylor & Zafman; Stephen M. De Klerk

(57) ABSTRACT

An integrated pulley-torsional damper assembly (1) comprises a hub (2) designed for being rigidly connected to a drive member (3), a pulley (4) connected to the hub (2) by means of a first ring (5) made of elastomeric material having the function of filter for the torsional oscillations, and an inertia ring (6), connected to the hub (2) by means of a second ring (7) made of elastomeric material, which defines with the inertia ring (6) a damping system. The first elastomeric ring is connected to the hub by mans of a coupling flange (25), which can be pack-tightened between an internal annular flange (10) of the hub and the drive member (3), the hub (2) comprising a first cylindrical wall (11) and a second cylindrical wall (12), which are coaxial with respect to one another and define between them an annular cavity (9) housing the first elastomeric ring (5), the external cylindrical wall (12) defining a support for the second elastomeric ring (7).

2 Claims, 1 Drawing Sheet

U.S. PATENT DOCUMENTS

| | | | |
|---|---|---|---|
| 5,390,774 A * | 2/1995 | Thurston et al. | 192/200 |
| 5,445,049 A * | 8/1995 | Ullrich et al. | 74/574.4 |
| 5,449,322 A * | 9/1995 | Wagner | 464/90 |
| 5,496,224 A * | 3/1996 | Rohs et al. | 475/91 |
| 5,516,331 A * | 5/1996 | Morr et al. | 464/7 |
| 5,637,041 A * | 6/1997 | Hamaekers et al. | 464/90 |
| 5,988,015 A * | 11/1999 | Riu | 74/574.2 |
| 6,062,104 A * | 5/2000 | Allport | 464/68.91 |
| 6,106,421 A * | 8/2000 | Graber et al. | 474/94 |
| 6,386,065 B1 * | 5/2002 | Hodjat | 74/574.4 |
| 7,025,187 B2 * | 4/2006 | Hammond et al. | 192/84.961 |

OTHER PUBLICATIONS

Mao Pu, et al: "synthesis of di-, tri-, and tetra- stearoyl riboflavins." HUAXUESHIJIE, 2000, (3):141-144.

Wu Xuedong et al: "the activities of long-effect riboflavin in preventing mouth ulceration after chemical therapeutics for leukaemia for enfant." Zhongguo Xiaoer Xieye, 1997 2(4):190.

* cited by examiner

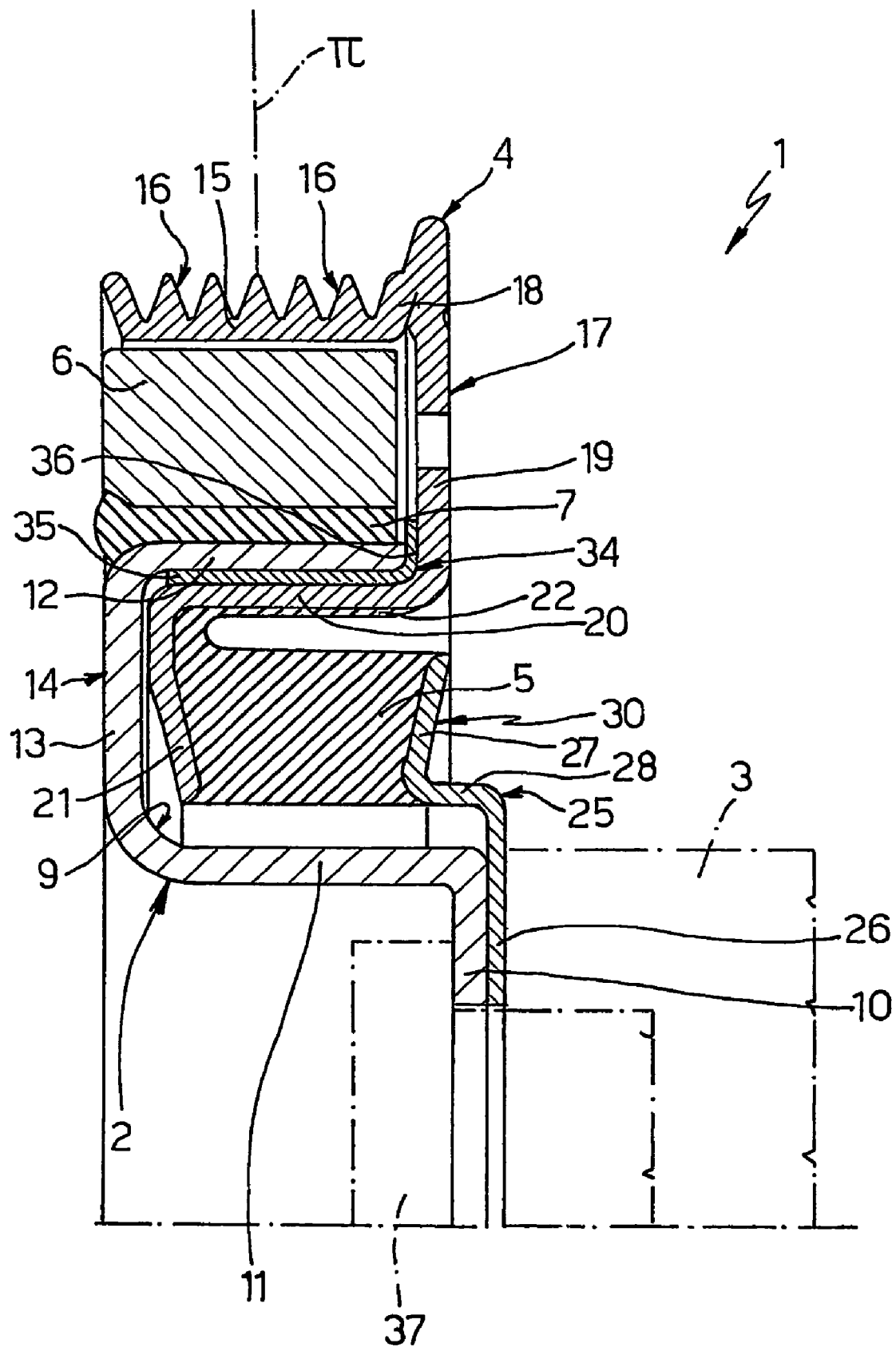

INTEGRATED PULLEY-TORSIONAL DAMPER ASSEMBLY

CROSS-REFERENCE TO OTHER APPLICATIONS

This is a National Phase of International Application No. PCT/IT2003/000432, filed on Jul. 10, 2003, which claims priority from Italian Patent Application No. TO2002A000622, filed on Jul. 16, 2002.

TECHNICAL FIELD

The present invention relates to an integrated pulley-torsional damper assembly.

BACKGROUND ART

Integrated pulley-torsional damper assemblies are known, which comprise a hub designed for being rigidly connected to a drive member, for example the drive shaft of an internal-combustion engine, a pulley connected to the hub by means of a first ring made of elastomeric material having the function of filter for torsional oscillations, and a inertia ring, connected to the hub by means of a second ring made of elastomeric material, which defines with the inertia ring a damping system.

Integrated assemblies of the type described briefly above are used, for instance, in the automotive sector and are connected, at one end of the drive shaft of an internal-combustion engine, to enable driving, by means of a belt transmission, of auxiliary members of the engine, for example, an alternator, a fan and/or a compressor, and enable, at the same time, damping of the torsional oscillations of the drive shaft.

U.S. Pat. No. 5,637,041 discloses an integrated pulley-torsional damper assembly having the features of the preamble of claim 1.

DISCLOSURE OF INVENTION

The purpose of the present invention is to provide an integrated pulley-damper assembly of an improved type, which has a particularly small number of components and presents contained axial dimensions.

The aforesaid purpose is achieved by an integrated pulley-torsional damper assembly as claimed in claim 1.

BRIEF DESCRIPTION OF THE DRAWING

For a better understanding of the present invention, there follows a description of a preferred embodiment, provided purely by way of non-limiting example, and with reference to the attached drawing, which illustrates a radial cross section of the assembly.

BEST MODE FOR CARRYING OUT THE INVENTION

With reference to the figure, the number 1 designates, as a whole, a pulley-torsional damper assembly according to the present invention.

The assembly 1 comprises a hub 2 designed for being rigidly connected to a drive member 3, for example, the drive shaft or a gear of the distribution rigidly constrained thereto, a pulley 4 angularly connected to the hub 2 by means of a first ring 5 made of elastomeric material (hereinafter referred to simply as "first elastomeric ring 5") having the function of filter for torsional oscillations, and a inertia ring 6 connected to the hub 2 by means of a second annular element 7 made of elastomeric material (hereinafter referred to simply as "second elastomeric ring 7"), which defines with the inertia ring 6 a damping system.

In greater detail, the hub 2 is made of stamped sheet metal and comprises integrally an internal annular flange 10 designed for connection to the drive member 3, an internal tubular wall 11 extending axially on the side opposite to the drive member 3 and co-operating radially with the second elastomeric ring 7, an external tubular wall 12, which is coaxial with respect to the internal tubular wall 11, and an end wall 13, which is plane, and connects integrally the tubular walls 11 and 12 together. The walls 11, 12 and 13 form, as a whole, an annular coupling portion 14 of the hub 2, which presents a substantially C-shaped cross section open on the side where the flange 10 is located and defines an annular cavity 9.

The inertia ring 6 is mounted on the outer tubular wall 12, with interposition in a forced way of the second elastomeric ring 7, and is withheld on the aforesaid wall exclusively as a result of the friction generated by the radial compression of the second elastomeric ring 7.

The pulley 4, which is conveniently of the type having multiple grooves (poly-V type), is conveniently made of sheet metal by means of successive pressing and rolling operations and comprises integrally a substantially cylindrical peripheral crown 15, which defines, on one of its outer surfaces, a plurality of V-shaped grooves 16, which are symmetrical with respect to a median plane II, and an annular flange 17, which extends integrally inwards from an axial end 18 of the crown 15, which faces the drive member 3.

The flange 17 basically comprises a plane outer annular portion 19, an intermediate tubular wall 20, which is coaxial with respect to the crown 15 and is internal thereto, and an inner annular flange 21, which extends from an axial end of the tubular wall 20 opposite to the outer annular portion 19. Conveniently, the flange 21 has a conical profile converging in the direction of the plane outer annular portion 19 towards the drive member 3. The flange 21 is fitted to the first elastomeric ring 5, with which it forms a single body. Conveniently, the first elastomeric ring 5 has an outer lip 22, which adheres to the inner face of the tubular wall 20 of the flange 17 of the pulley 4.

According to a preferred embodiment of the invention, the assembly 1 comprises a coupling flange 25 having the function of connecting the first elastomeric ring 5 to the hub 2.

In greater detail, the coupling flange 25 comprises an inner annular wall 26 set so that it bears axially upon the flange 10 and of the hub 2, and a conical annular edge 27 radiused to the inner annular wall 26 by means of a step-shaped portion 28. The conical annular edge 27 is set facing the flange 21 of the pulley 4, diverges outwards with respect to the latter, and is fitted to the first elastomeric ring 5 on the axially opposite side.

On account of the conicity of the flange 21 and of the annular edge 27 of the coupling flange 25, the first elastomeric ring 5 has a substantially trapezoidal cross section, which diverges outwards. Connection of the pulley 4 and the coupling flange 25 to the first elastomeric ring 5 is obtained in a vulcanization mould (not illustrated). After vulcanization, the coupling flange 25, the first elastomeric ring 5, and the pulley 4 define a transmission member 30 in the form of a single body.

The first elastomeric ring 5 is made of a relatively "soft" elastomeric material, i.e., one with a sufficiently low modulus of elasticity. The resulting high torsional deformability enables "filtration" of the pulse-like variations of torque and resistant torque, thus providing a sort of "flexible coupling" between the drive member 3 and the pulley 4.

The transmission member 30 is mounted on the coupling portion 14 of the hub 2 with interposition of a bushing 34 having the function of a radial and axial bearing for supporting the pulley 4 with respect to the hub 2 with a minimum friction between the two. In particular, the bushing 34 comprises integrally a tubular portion 35, which is set radially between the outer tubular wall 12 of the hub 2 and the intermediate tubular wall 20 of the pulley 4, and a flange 36, which is set axially between the plane outer annular portion 19 of the flange 17 of the pulley 4 and a free edge of the outer tubular wall 12 of the hub 2.

The bushing 34 is conveniently made of a plastic material having a low coefficient of friction, such as, for example, a fluoropolymer.

Once assembly is completed, the first elastomeric ring 5 is housed inside the cavity 9 of the coupling portion 14 of the hub 2. In an altogether similar way, the second elastomeric ring 7 and the inertia ring 6 are housed inside the crown 16 of the pulley 4. The assembly 1 is therefore particularly compact in the axial direction.

Installation of the assembly 1 on the drive member 3 is obtained by means of a single axial tap screw 37, which pack-tightens the flange 10 of the hub 2 and the annular wall 26 of the coupling flange 25, and is axially screwed into the drive member 3.

In use, the pulley 4 is fitted rotationally to the hub 2 and to the drive member 3 by means of the first elastomeric ring 5, which filters any lack of uniformity in the angular velocity of the drive shaft and filters any instantaneous variations of resistant torque. The inertia ring 6 and the second elastomeric ring 7 are sized, in terms of moment of inertia of the former and torsional elasticity of the latter, to obtain pre-set damping characteristics.

From an examination of the characteristics of the assembly 1 built according to the present invention, the advantages that the said invention enables emerge evidently.

In the first place, the arrangement of the hub 2, of the pulley 4 and of the bushing 34 enables a reduction in the total number of components (seven in the example illustrated), as well as a simultaneous reduction of the axial dimensions.

Furthermore, the axial position of the pulley 4 is defined accurately and does not require the need for any subsequent machining operations once assembly is complete, since it depends upon a small combination of tolerances, which can be easily controlled during production. In particular, there are only four parameters subject to tolerance which condition the axial position of the grooves of the pulley, namely, the distance between the median plane M of the grooves 16 of the pulley 4 and the inner face of the plane outer annular portion 19 of the flange 17 of the pulley 4, the thickness of the flange 36 of the bushing 34, the distance between the free edge of the outer tubular wall 12 and the plane of the outer face of the flange 10 of the hub 2, and the thickness of the coupling flange 25.

Finally, the noise of the device is attenuated since the pulley 4 is "shielded" by the inertia ring 6, which is not in rigid connection with the drive shaft and, hence, is isolated from any causes of forced oscillation.

A further advantage is represented by the fact that the bushing 34, thanks to its arrangement, is protected from external agents (water, dirt).

Finally, it is clear that modifications and variations can be made to the integrated assembly 1 described herein, without thereby departing from the sphere of protection of the ensuing claims.

The invention claimed is:

1. An integrated pulley-torsional damper assembly including a hub designed for being rigidly connected to a drive member, a pulley connected to the hub by means of a first elastomeric ring having the function of a filter for torsional oscillations, an inertia ring connected to the hub by means of a second elastomeric ring defining with the inertia ring a damping system, said hub comprising an internal annular flange designed for connection to said drive member and an annular coupling portion integral with said internal annular flange, said annular coupling portion integrally including a first tubular wall connected to and extending axially from said internal annular flange, a second tubular wall coaxial and radially external to the first tubular wall, and an end wall connecting said first tubular wall to said second tubular wall at an axial end thereof opposite to said annular flange, said first tubular wall, second tubular wall and end wall defining an annular cavity which has an open axial end on the side where said internal annular flange is located, said pulley comprising a peripheral crown and a flange extending radially inwards from said peripheral crown and including an outer annular portion, an intermediate tubular wall coaxial with respect to said crown and extending coaxially inside said second tubular wall of said hub, and an inner annular flange extending radially inwards from an axial end of the intermediate tubular wall opposite to the outer annular portion and adjacent said end wall of said annular coupling portion, the assembly comprising a coupling flange provided with an inner annular wall bearing axially against said flange of said hub and with a peripheral annular edge located at said open end of said annular cavity and facing said inner annular flange of said pulley, wherein said first elastomeric ring is set axially between said inner annular flange of said pulley and said peripheral annular edge of said coupling flange and forms a single body with them; and wherein said inertia ring is contained inside said crown of said pulley and supported on said second tubular wall of said hub via said second elastomeric ring, said first elastomeric ring is housed within said cavity of said annular coupling portion, and a bearing is set between said second tubular wall and said pulley for radial and axial support of said pulley with respect to said hub.

2. The assembly according to claim 1, characterized in that said bearing comprises integrally a tubular portion, radially set between said outer tubular wall of said hub and said intermediate tubular wall of said pulley, and a flange axially set between said outer annular portion of said flange of said pulley and said outer tubular wall of said hub.

* * * * *